May 10, 1966 E. SPIESSL 3,250,198
PHOTOGRAPHIC SHUTTER
Filed July 3, 1963 2 Sheets-Sheet 2

United States Patent Office 3,250,198
Patented May 10, 1966

3,250,198
PHOTOGRAPHIC SHUTTER
Ewald Spiessl, Deisenhofen, near Munich, Germany, assignor to Compur-Werk Gesellschaft mit beschrankter Haftung & Co., Munich, Germany, a firm of Germany
Filed July 3, 1963, Ser. No. 292,579
Claims priority, application Germany, July 10, 1962, C 9,501
8 Claims. (Cl. 95—63)

This invention relates to a photographic shutter.

An object of the invention is the provision of a generally improved and more satisfactory shutter.

Another object of the invention is the provision of a shutter having improved means for adjusting the shutter for taking bulb or B exposures, when desired.

Still another object is the provision of an improved shutter particularly adapted to automatic control of the exposure time by means of a photoelectric exposure meter or the like.

A further object is the provision of a photographic shutter so designed that the adjustment or setting means for setting the shutter for taking a bulb or B exposure, is movable independently of the means for adjusting the time or length of exposure when the exposure is timed by the internal mechanism of the shutter rather than by external means (as in making a B exposure), so that the frictional resistance of adjusting the mechanism for taking a bulb exposure does not affect or add to the resistance to be overcome in setting the time of an internally timed exposure, whereby the timing or speed of an internally timed or "instantaneous" exposure can be controlled accurately by the relatively weak power of a photoelectric exposure meter without being affected by the added resistance which must be overcome when setting for a bulb or B exposure.

These and other desirable objects may be attained in the manner disclosed as an illustrative embodiment of the invention in the following description and in the accompanying drawings forming a part hereof, in which.

Many parts of the shutter are of well known or conventional construction, and therefore are not illustrated because they are well understood in the art. It is only the bulb or B exposure mechanism, and associated parts, with which the present invention is concerned, and the other parts can be of any conventional known construction.

Figure 1:
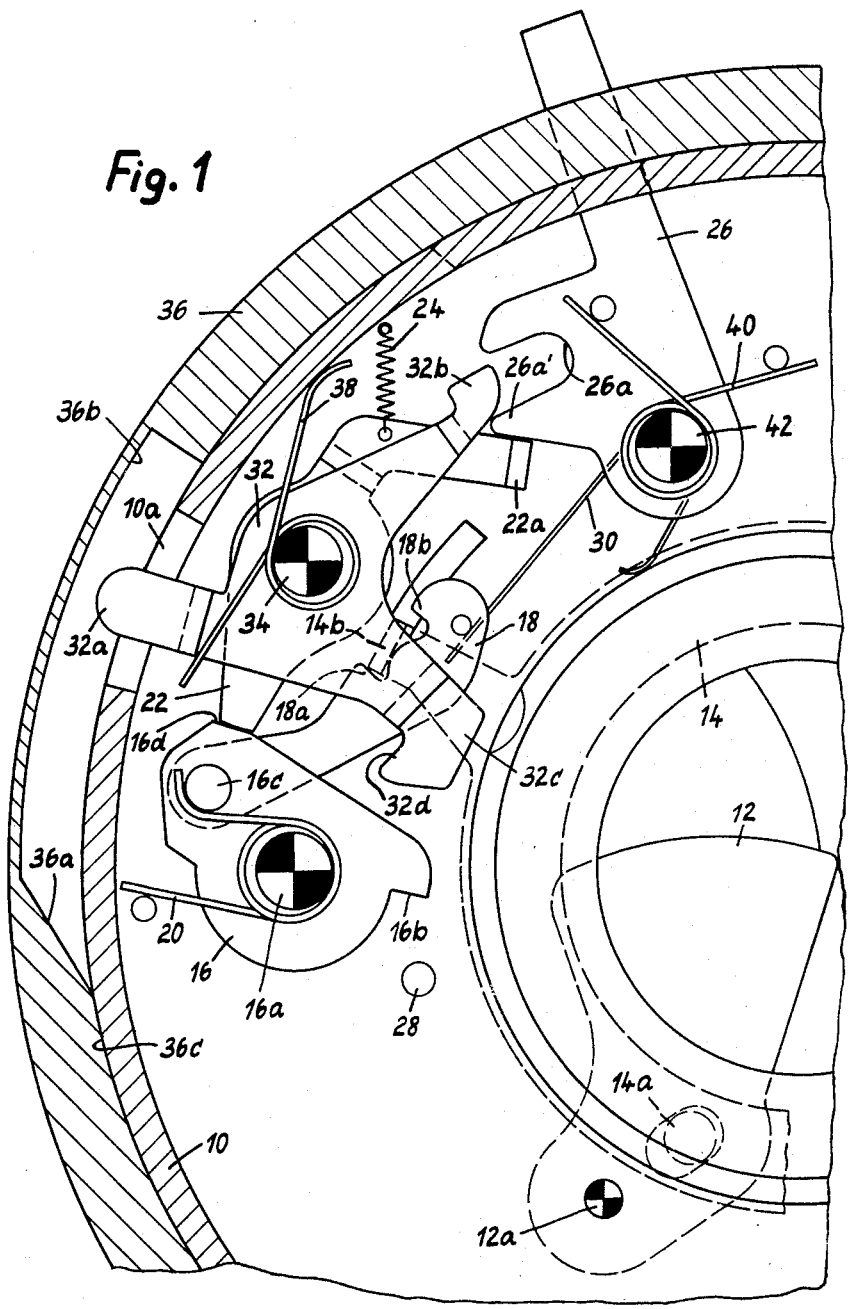
FIG. 1 is a fragmentary front face view, with the cover plate and other parts removed, of a photographic shutter in accordance with a preferred embodiment of the invention, showing those operating parts necessary to an understanding of the present invention, in cocked or tensioned position ready for making a bulb exposure.

The invention is illustrated as applied to an objective shutter having the usual housing or casing 10 of annular form and having any suitable manner (for example, five) of pivoted shutter blades 12, each individually mounted on its pivot 12a. The blades are swung first in one direction for opening the shutter, and then in the opposite direction for closing the shutter, by means of a blade ring 14 rotatable as usual about the optical axis of the shutter as a center, the blade ring having shutter blade operating pins 14a, one for each blade, engaging respective slots in the respective blades. The blade ring is turned first in one direction and then in the opposite direction by a main operating member or "master member" 16 mounted on a shaft 16a which preferably extends parallel to the optical axis, out through the back wall of the shutter and into the body of the associated camera on which the shutter is mounted, in which body there is suitable conventional mechanism well known in the art for turning the shaft 16a and the master member 16 (usually simultaneously with the winding of the film) in a counterclockwise direction when viewed from the front as in FIG. 1, to move the master member from its rest or run down position occupied at the end of an exposure, to its cocked or tensioned position wherein the main spring or master spring 20 is tensioned or wound. As seen in FIG. 1, one end of the spring 20 reacts against a fixed pin, and the other end reacts against an upstanding pin 16c on the master member 16, in a direction to tend to turn the master member clockwise. When the master member reaches its tensioned positioned, it is held in such position by a latch 22, as further mentioned below.

Figure 2:
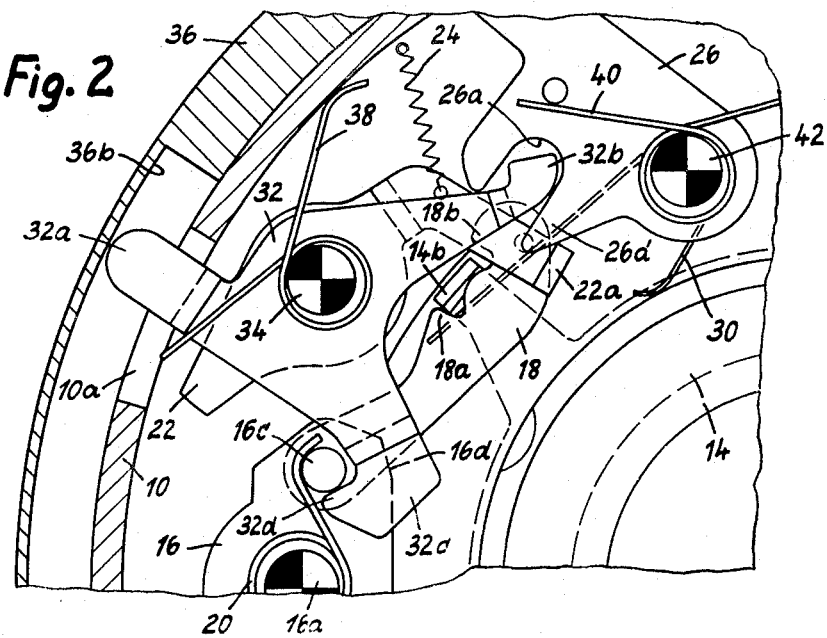
FIG. 2 is a view similar to a fragment of FIG. 1, showing the parts at an intermediate position while making a bulb exposure, with the shutter blades fully open.

Pivoted on the downwardly extending end of the pin 16c is the operating member or link 18 having on its left edge a notch or recess for receiving and cooperating with the upstanding ear 14b on an arm of the blade ring 14. A light spring 30 tends to press the free end of the link 18 outwardly away from the optical axis, keeping the link engaged with the ear 14b on the blade ring. In the initial or cocked position of the parts as shown in FIG. 1, the ear 14b is engaged with the abutment 18a at the end of the notch which is closer to the master member. If the master member is unlatched or released by the latch 22 (as described below) the force of the master spring 20 will cause the master member to turn in a clockwise direction, so that the link 18 will be moved in a direction upwardly from the bottom of FIG. 1 toward the top of FIG. 1, and the abutment 18 thereon will push upwardly on the ear 14b, thereby turning the blade ring 14 in a clockwise direction about the optical axis as a center, to swing the blades from the closed position shown in FIG. 1 to the fully open position of FIG. 2. This action occurs during the first part of the running-down movement of the master member. Then, as the master member continues to run down in a clockwise direction, the crank pin 16c thereof pulls downwardly on the link 18 (that is, in a direction from the top of FIGS. 1 and 2 down toward the bottom thereof) and the abutment 18b at the other or remote end of the notch engages the remote edge of the upstanding ear 14b on the blade ring and pulls it downwardly, toward the bottom of FIGS. 1 and 2, thereby swinging the blade ring back in a counterclockwise direction and moving the shutter blades back to closed position.

During the full running down movement of the master member 16, from its initial cocked or tensioned position shown in FIG. 1, to its final rest position, the master member turns through an angle of approximately 150 degrees. In the rest position of the parts, the abutment 18a on the link 18 is in such position that it will not engage the ear 14b on the blade ring but will slide past the blade ring when the links moves during the tensioning or cocking of the master member. This is well understood in the art.

As already mentioned, there is a latching lever 22 which holds the master member 16 in its cocked or tensioned position. The latching lever 22 is mounted for oscillation on the fixed pivot 34, and has one end adapted to engage a nose or abutment portion 16d on the master member 16, to hold the master member in tensioned position. A light spring 24 tends to turn the latching lever 22 in a counterclockwise direction on its pivot, thereby tending to keep the first mentioned end in latching engagement with the master member 16, and to keep an ear or lug 22a on the opposite end of the latching lever in engagement with a portion of the trip lever or trigger lever or release member 26, pivoted at 42 and influenced by a spring 40 which tends to turn the release member in a clockwise direction. For releasing or triggering the shutter to initiate an exposure, the member 26 may be turned slightly in a counterclockwise direction, either by any conventional connection from a remote point, or by finger pressure applied to an externatlly accessible portion of the lever extending out through a suitable slot in the shutter housing. When the release member 26 is operated in a counterclockwise direction, it presses against the end 22a of the latching lever 22 and swings the latching lever in a clockwise direction on its pivot, thereby releasing the opposite end of latching lever from the master member 16 and permitting the master member to run down in a clockwise direction toward its rest position, to open and close the shutter blades as above mentioned. If the exposure is to be timed internally (that is, an "instantaneous" exposure) rather than externally, the retarding or delaying of the running down movement of the master member is accomplished in the usual way, by having the nose portion 16b on the master member engage with any suitable one of the many known forms of retarding gear or delaying mechanism well known in the art, the details of which are not important for purposes of the present invention. At the end of the running down movement of the master member, the final rest position thereof is determined by engagement of the abutment portion 16d on the master member with a fixed pin 28.

During the subsequent cocking or tensioning motion of the master member, already mentioned above, the blade ring 14 is held in its blade-closed position by any suitable known means (e.g., a light spring, not shown) while the link 18 slides over the ear 14b on the blade ring, held lightly in contact therewith by the spring 30.

The bulb or B exposure control mechanism of the present invention comprises a B latching lever 32, pivoted preferably on the same bearing pin 34 which serves as a bearing for the latching lever 22. This lever 32 has one arm 32a which extends approximately radially outwardly through a slot 10a in the shutter housing 10, into a position to cooperate with the setting member 36, which preferably but not necessarily is in the form of a ring concentric with the optical axis and rotatable externally on the shutter housing. The setting member 36 is internally recessed or notched at 36b, one end of the notch being sloped as at 36a to form a cam surface which cams the end 32a of the lever 32 inwardly toward the center of the shutter, when the setting member 36 is shifted from the position shown in FIGS. 1 and 2 to the position shown in FIG. 3. A spring 38 tends to turn the B lever 32 in a clockwise direction.

The second end 32b of this lever 32 is in position to engage in a slot 26a of the release member 26, bearing against the nose 26a' forming one side of this slot, whenever the recess 36b of the setting member 36 is opposite the end 32a so that the lever 32 can swing far enough in a clockwise direction to cooperate with this notch 26a. However, when the setting member 36 is moved so that the cam 36a thereof cams the end 32a inwardly to the position shown in FIG. 3, then the end 32b is displaced from the notch 26a and nose 26a' and no longer cooperate therewith.

The bulb latching lever 32 also has a third arm 32c having a hook portion or nose 32d which is in position (when the lever 32 is swung to the position shown in FIG. 2) to engage the upstanding end of pin 16c on the master member 16 and stop the running down motion of the master member in a position wherein the shutter blades are fully open.

Figure 3:
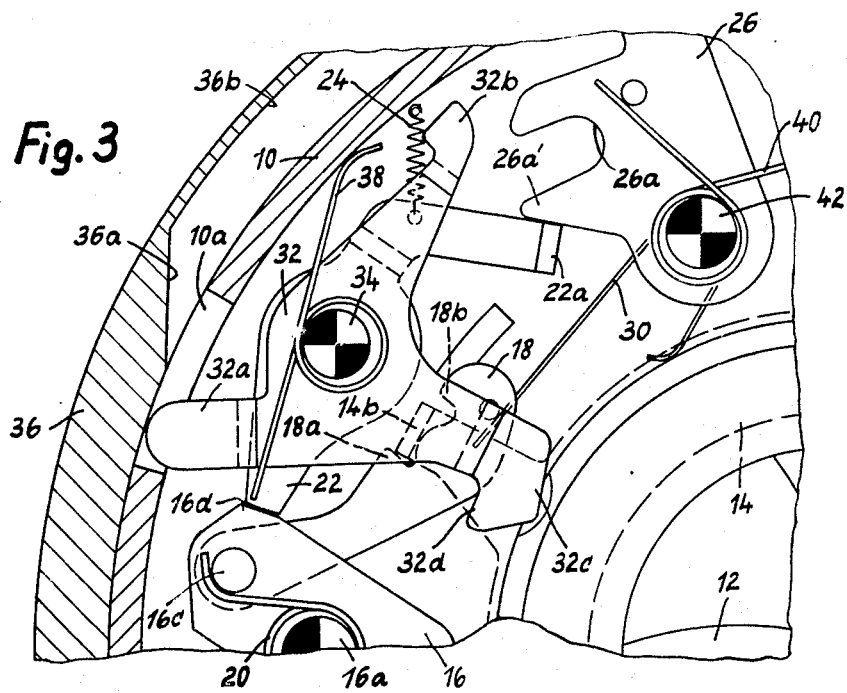
FIG. 3 is a view similar to a fragment of FIG. 1, showing the parts in the cocked or tensioned position ready for making an ordinary "instantaneous" exposure as distinguished from a bulb or B exposure.

For making an ordinary instantaneous exposure (timed by the timing mechanism of the shutter rather than by external manipulation by the photographer) the setting member 36 is moved to the position shown in FIG. 3, thereby swinging the bulb control lever 32 in a counterclockwise direction (against the force of its spring 38) to the position shown in FIG. 3, where it is entirely ineffective and does not interfere with the normal running down movement of the master member 16. The exposure is then made in the usual way, by moving the release lever 26 counterclockwise, so that the nose 26a' thereon moves the latching lever 22 clockwise, but at this time the bulb control lever 32 is sufficiently far removed from the release member 26 so that it is not engaged thereby. When the latch 22 is released, the master member runs down in the manner above described, and the exposure is timed by the conventional timing or retarding mechanism engaging in the conventional way with the nose 16b on the master member, so that the mechanism opens and shuts the shutter blades at the required speed or interval. However, if it is desired to make an externally timed bulb or B exposure, then the setting member 36 is moved to the position shown in FIGS. 1 and 2, bringing the recess 36b opposite the arm 32a, so that the spring 38 can move the member 32 slightly in a clockwise direction from the position shown in FIG. 3 to the position shown in FIG. 1, bringing the end 32b into cooperation with the release member 26 as illustrated. Then if the release member 26 is moved in a counterclockwise direction, it not only causes a releasing motion of the latch 22, but simultaneously it also moves the B lever 32 in a clockwise direction to the position shown in FIG. 2, so that the hook or nose 32d is brought to a position intercepting the pin 16c on the master member. Thereby the motion of the master member is stopped at an intermediate position with the shutter blades fully open, and it remains in this position as long as the release member 26 is held in its actuated position shown in FIG. 2. Then when the displacing force or pressure on the release member 26 is removed, the spring 40 returns the release member in a clockwise direction to its initial position, and the portion 26a' thereof, engaging with the end 32b of the bulb lever 32, moves the bulb lever back to the position shown in FIG. 1, thereby releasing the hook or abutment 32d from the pin 16c, thereby allowing the master member to continue its running-down movement, to close the shutter blades.

The spring 40 acting on the release member 26 is, of course, stronger than the spring 38 acting on the B lever 32, so that the force of the spring 38 does not cause actuation of the trigger 26 in a releasing direction. Moreover, the spring 40 is sufficiently strong so that the power of this spring, in addition to overcoming the power of the spring 38, also overcomes the frictional resistance of withdrawing the hook 32d from the pin 16c when the bulb exposure is to be terminated. Accordingly, it is not necessary to use positive force in moving the trigger or release member 26 back from its actuated position shown in FIG. 2 to its initial position shown in FIG. 1, since the spring 40 will move it back as soon as the displacing force is removed.

With this arrangement, it is seen that the setting member 36 for controlling the bulb operation or instantaneous operation of the shutter, is entirely independent of any setting mechanism which may be employed for determining the length of an instantaneous exposure. Thus the setting member 36 does not require more than two positions, one for a bulb exposure and the other for an instantaneous exposure, and any other setting mechanism of known form (e.g., automatic timing mechanism controlled from a photoelectric exposure meter) can be employed for determining the duration of any particular "instantaneous" exposure. Therefore, with this arrangement, the mechanism for controlling the duration of an instantaneous exposure does not need to overcome the resistance encountered in turning the setting ring 36 from a bulb exposure position to an instantaneous exposure position, or vice versa, and thus the rather small power or force available from a photoelectric exposure meter is sufficient for setting the duration of an exposure, when an internaly timed exposure is desired. It is sufficient if the control member 36 is graduated on its circumference merely with two indications B and A, selectively brought opposite a suitable stationary index mark on the shutter, the graduations being so arranged that when the designation B is brought opposite the index mark, the setting ring 36 will be in the position shown in FIGS. 1 and 2, for making a bulb exposure, and when the graduation A is brought opposite the index mark, the setting ring will be in the position shown in FIG. 3, wherein the bulb mechanism is ineffective and the automatic exposure control mechanism takes over and controls either the duration of the exposure or the diaphragm aperture therof, or both.

This bulb exposure control mechanism is extremely simple, takes up but little room in the shutter housing, and at the same time is extremely strong and sturdy and not likely to get out of order. It is easy and inexpensive to manufacture. It is useful in shutters in which the exposure value of an instantaneous exposure is manually adjusted or controlled by manual adjustment of shutter speed or diaphragm aperture or both, but it is particularly and especially useful in shutters where the exposure value of an instantaneous exposure is to be automatically controlled.

It is seen from the foregoing disclosure that the objects and purposes of the invention are well fullfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising shutter blades movable between open and closed positions, a master member movable through a running-down movement from a tensioned position to a rest position and effective during such movement to open the shutter blades and then to close them, a releasable latch for holding said master member in its tensioned position, a trigger member movable from a rest position to an actuated position and effective during such movement to release said latch, a bulb exposure control member, and a setting member movable to render said bulb exposure control member selectively effective or ineffective, characterized by the fact that said bulb exposure control member is in the form of a three-armed lever having a first arm in position to be engaged and moved by said setting member, a second arm selectively movable into engagement with said trigger member, and a third arm having a latching nose for engaging said master member to stop the running-down movement of the master member at an intermediate position wherein the shutter blades are open, the parts being so proportioned that when said setting member is moved to a position for rendering said control member effective, the second arm of said control member engages said trigger member and subsequent movement of said trigger member to its actuated position serves to move said control member to a position wherein the latching nose on the third arm thereof is effective to stop the running-down movement of the master member.

2. A construction as defined in claim 1, further characterized by a spring engaging said control member to tend to move the second arm thereof into engagement with said trigger member.

3. A construction as defined in claim 1, further characterized by a first spring engaging said control member to tend to move the second arm thereof into engagement with said trigger member and to press it against the trigger member in a direction tending to move said trigger member toward its actuated position, and a second spring tending to move said trigger member from actuated position toward its rest position, said second spring exerting greater force on said trigger member than said first spring.

4. A construction as defined in claim 1, wherein said shutter includes an annular housing, and wherein said setting member is in the form of a ring rotatable circumferentialy on said annular housing and having a cam portion said first arm of said control member.

5. A construction as defined in claim 1, wherein said shutter includes an annular housing, and wherein said setting member is in the form of a ring rotatable circumferentially on said annular housing and having a cam portion for engaging said first arm of said control member to shift said control member from effective bulb-exposure position to an ineffective position and having a recessed portion movable to a position opposite said first arm to allow freedom of movement of said first arm when said control member is to be effective to control a bulb exposure.

6. A photographic shutter of the type for making internally timed instantaneous exposures and externally timed B exposures, said shutter including a master member mounted for a running-down movement from a tensioned position to a rest position and effective during such movement to open shutter blades and then to close them, a releasable latch for holding said master member in tensioned position, and a movable trigger member for releasing said latch, characterized by a B exposure control member movable from an ineffective first position out of the paths of movement of both said master member and said trigger member to an intermediate second position still out of the path of movement of said master member but in the path of actuating movement of said trigger member, said control member being further movable by actuating movement of said trigger member to a third position wherein said control member is in the path of movement of said master member and is effective to stop the running-down movement of said master member at an intermediate point wherein the shutter blades are open, and a setting member movable to one position wherein said control member may move to its second and third positions, said setting member being movable to another position holding said control member in its ineffective first position.

7. A photographic shutter of the type for making internally timed instantaneous exposures and externally timed B exposures, said shutter including a master member mounted for a running-down movement from a tensioned position to a rest position and effective during such movement to open shutter blades and then to close them, a releasable latch for holding said master member in tensioned position, and a movable trigger member for releasing said latch, characterized by a B exposure control member movable from an ineffective first position out of the paths of movement of both said master member and said trigger member to an intermediate second position still out of the path of movement of said master member but in the path of actuating movement of said trigger member, said control member being further movable by actuating movement of said trigger member to a third position wherein said control member is in the path of movement of said master member and is effective to stop the running-down movement of said master member at an intermediate point wherein the shutter blades are open, a spring tending to move said conrol member from its first position toward its second position, and a setting member manually movable independently of any setting means for timing instantaneous exposures, said setting member being movable from one position in which it is ineffective to restrain movement of said control member to its second and third positions, when a B exposure is to be made, to another position effective to hold said control member in its ineffective first position against the force of said spring, when an instantaneous exposure is to be made said B exposure control member being in the form of a three-armed lever having a first arm for cooperating with said setting member, a second arm for cooperating with said trigger member, and a third arm for cooperating with and stopping movement of said master member when said control member is in its third position.

8. A construction as defined in claim 7, wherein said second arm and said trigger member are so shaped that when said control member is in its second position, actuating movement of said trigger member to release said latch will move said control member from its second to its third position and subsequent reverse movement of said trigger member will restore said control member from its third position to its second position.

No references cited.

JOHN M. HORAN, *Primary Examiner.*